G. W. N. Yost,
Harvester Cutter.
No. 14,266.    Patented Feb. 12, 1856.
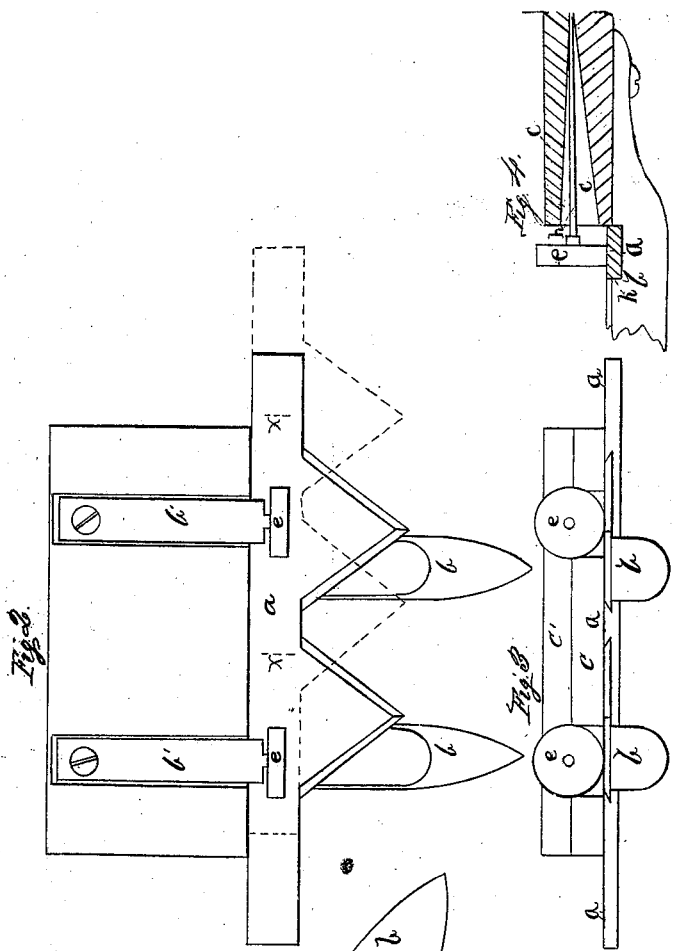
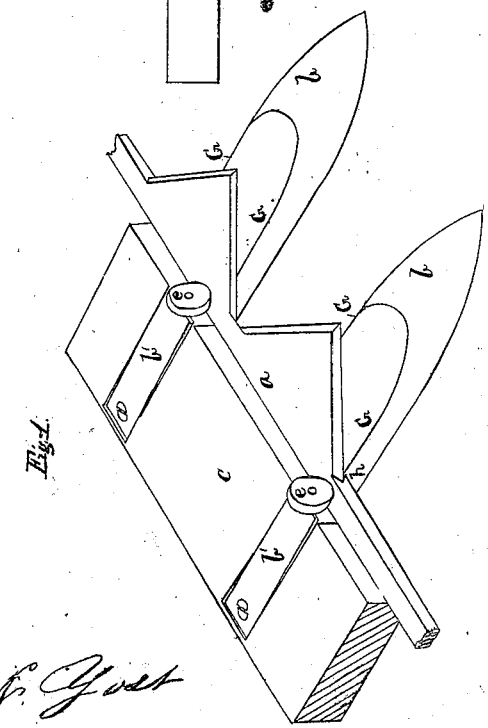
G. W. N. Yost

UNITED STATES PATENT OFFICE.

GEO. W. N. YOST, OF PITTSBURG, PENNSYLVANIA.

IMPROVEMENT IN GRAIN AND GRASS HARVESTERS.

Specification forming part of Letters Patent No. 14,266, dated February 12, 1856.

*To all whom it may concern:*

Be it known that I, G. W. N. YOST, of Pittsburg, Allegheny county, and State of Pennsylvania, have invented an improvement in preventing clogging in the cutting parts of reaping and mowing machines; and I do hereby declare that the following is a full, clear, and exact description of the principle or character which distinguishes it from all other things before known, and of the usual manner of making or modifying and using the same, reference being had to the accompanying drawings, of which—

Figure 1 represents a perspective of my machine with one-half of the finger-board removed; Fig. 2, a plan of same, showing the cutter-bar in two positions. The dotted cross-lines $x\,x$ show where the periphery of the rollers touched it when in the position shown in black lines. Fig. 3 is an end view, showing rollers and half of cutter-bar set in the groove or slot in the fingers; Fig. 4, a cross-section through the finger-board cutter-bar, and having part of the fingers and knife broken off.

My invention consists in an improvement in reaping and mowing machines, whereby the cutting is facilitated and all possibility of clogging prevented, and at the same time overcoming the great friction produced in the reciprocating motion of the sickle-blade.

I am aware that many attempts have been made to accomplish these very important advantages in the cutting parts of reaping and mowing machines, to prevent "gumming," clogging of the knives, and to insure a free and easy cut; but no very important and practicable results have yet been attained, and this subject not been brought to perfection.

I am enabled by a simple contrivance, hereinafter described, to produce a blade which, according to the opinion of some of our most enterprising and skillful men who have paid particular attention to this subject, is the most practicable, simplest, and cheapest improvement ever brought before the public. I have exhibited it to many, and all agree that it is just what is wanted, and say it is a wonder it was not invented before, and, if invented, not brought into extensive sale and use.

My invention has for its object and accomplishes many and all the important requirements of a sickle-blade, and it is emphatically called a "self-sharpening" and "anti-clogging" cutter, which I describe as follows:

Fig. 1 represents a perspective view of a section of a cutter-bar and finger-board with two fingers, $b\,b$, bolted to the under side of this finger-board, lettered $c$. I construct this finger-board of two planks about an inch thick each. The upper plank, or half of this, is removed to exhibit the springs $b'\,b'$, which are placed at required intervals on the upper surface of the under part, $c$, of the finger-board. The springs $b'\,b'$ project over the finger-board, and are provided with axles, on which are placed friction-rollers $e\,e$. These rollers revolve on the cutter-bar, and are kept down by the springs $b'\,b'$ with sufficient strength to prevent the cutter-bar from rising up while in the act of cutting grass or grain, and at the same time, if sticks or other matter that would be apt to injure the cutting-edge of the knife were to come into contact with it the knife will rise and let it pass uncut. These knives or sickles are beveled downward and cut against the square edges $g\,g$ of the fingers $b\,b$. I construct these fingers of the shape shown in Figs. 1 and 2, and they have a slot, $h$, cut in them, as seen at Fig. 4, to receive the cutter-bar $a$, and to prevent it from getting out of place. If the rollers $e\,e$ were to revolve entirely round, they would be very apt to get entangled by the grain or grass, and thus stop them, and thereby produce a great friction upon the cutter-bar; but I remedy this by having their circumference twice as great as the distance they have to travel, or, in other words, the crank for operating the cutter-bar makes one revolution while the rollers, whose axes are stationary, make but half a revolution. By this arrangement I prevent the wheel from turning round, and of course it will not clog.

The springs are covered over by the upper half of the finger-board $c'$, as shown in Figs. 3 and 4, for the purpose of preventing any impediment from getting between them and the finger-board $c$, which would prevent them from operating. A space the width of the spring is mortised out of the finger-board $c$ and $c'$ for the purpose of giving it free action, as seen in Fig. 4.

I do not claim springs for holding the cutter-bar against the upper portion of the finger, as in the patent of Sylvester Colburn; but What I do claim is—

Combining with the cutter-bar of harvesters a series of friction-rollers, when said rollers are kept constantly pressed down on the cutter-bar by means of springs $b'\ b'$, for the purposes and substantially as set forth.

GEO. W. N. YOST.

Witnesses:
R. S. CAMPBELL,
R. GRAY CAMPBELL.